US012612339B2

(12) United States Patent (10) Patent No.: US 12,612,339 B2
Callaway (45) Date of Patent: Apr. 28, 2026

(54) LAYERED INTERFACE COATING FOR IMPROVED FIBER PROTECTION AND MATRIX CRACK SEALING

(71) Applicant: Raytheon Technologies Corporation, Farmington, CT (US)

(72) Inventor: Evan B. Callaway, Santa Barbara, CA (US)

(73) Assignee: RTX Corporation, Farmington, CT (US)

( * ) Notice: Subject to any disclaimer, the term of this patent is extended or adjusted under 35 U.S.C. 154(b) by 789 days.

(21) Appl. No.: 17/970,993

(22) Filed: Oct. 21, 2022

(65) Prior Publication Data

US 2024/0132413 A1 Apr. 25, 2024
US 2024/0228388 A9 Jul. 11, 2024

(51) Int. Cl.
*C04B 35/628* (2006.01)
*C04B 35/565* (2006.01)
(Continued)

(52) U.S. Cl.
CPC ...... *C04B 35/62868* (2013.01); *C04B 35/565* (2013.01); *C04B 35/62873* (2013.01);
(Continued)

(58) Field of Classification Search
CPC ............ C04B 35/62868; C04B 35/565; C04B 35/62873; C04B 41/457; C04B 41/5059;
(Continued)

(56) References Cited

U.S. PATENT DOCUMENTS

| 5,952,100 | A | * | 9/1999 | Corman | ............ | C04B 35/62855 |
| | | | | | | 428/386 |
| 6,365,233 | B1 | * | 4/2002 | Corman | ............ | C04B 35/62852 |
| | | | | | | 427/430.1 |

(Continued)

FOREIGN PATENT DOCUMENTS

JP 2000351676 A 12/2000

OTHER PUBLICATIONS

Extended European Search Report for EP Application No. 23191951.5, dated Feb. 14, 2024, 5 pages.

*Primary Examiner* — Jennifer A Steele
(74) *Attorney, Agent, or Firm* — Kinney & Lange, P.A.

(57) ABSTRACT

A coated fiber structure for use in a ceramic matrix composite comprises a fiber extending along a fiber axis and an interface coating arrangement applied to and circumscribing the fiber. The interface coating arrangement comprises: a first boron nitride layer extending coaxially about and in direct contact with the fiber, a first silicon-doped boron nitride layer extending coaxially about and in direct contact with the first boron nitride layer, a carbon layer extending coaxially about and in direct contact with the first silicon-doped boron nitride layer, a second boron nitride layer extending coaxially about and in direct contact with the carbon layer, and a second silicon-doped boron nitride layer extending coaxially about and in direct contact with the second boron nitride layer. A silicon content of the first silicon-doped boron nitride layer is higher than the silicon content of the second silicon-doped boron nitride layer.

18 Claims, 2 Drawing Sheets

(51) Int. Cl.
    *C04B 41/45*        (2006.01)
    *C04B 41/50*        (2006.01)

(52) U.S. Cl.
    CPC ........ *C04B 41/457* (2013.01); *C04B 41/5059*
        (2013.01); *C04B 2235/5244* (2013.01); *C04B 2235/614* (2013.01)

(58) Field of Classification Search
    CPC ...... C04B 2235/5244; C04B 2235/614; C04B
        35/571; C04B 35/62884; C04B 35/62894;
        C04B 35/62897; C04B 35/80; C04B
        35/62844; C04B 35/62865; C04B
        35/62871; C04B 35/62878
    See application file for complete search history.

(56) References Cited

U.S. PATENT DOCUMENTS

| | | | |
|---|---|---|---|
| 7,597,838 B2 | 10/2009 | Subramanian et al. | |
| 9,512,044 B2 | 12/2016 | Lazur et al. | |
| 2005/0181192 A1* | 8/2005 | Steffier .................... | B32B 18/00 |
| | | | 428/293.4 |
| 2022/0055955 A1 | 2/2022 | Kidd et al. | |
| 2024/0043345 A1* | 2/2024 | Callaway .......... | C04B 35/62894 |
| 2024/0051879 A1* | 2/2024 | Colby .............. | C04B 35/62873 |

\* cited by examiner

LAYERED INTERFACE COATING FOR IMPROVED FIBER PROTECTION AND MATRIX CRACK SEALING

BACKGROUND

The present invention relates to ceramic matrix composites, and more particularly to the formation of corrosion-resistant coatings therein.

Fiber-reinforced ceramic matrix composites (CMCs) are known and used for components that are exposed to high temperatures and corrosive conditions that can degrade other kinds of materials. Under such severe conditions, such as the operating conditions in aerospace applications, even ceramic materials are vulnerable to degradation. Over time, ceramic composites can form microcracks that further expose the ceramic material to oxygen or other corrosive elements, which form undesirable phases to the detriment of the properties of the ceramic matrix composite component.

Fibers can be coated with a layer of boron nitride to form a weak interface between the fibers and matrix material to enable desired composite characteristics. Boron nitride can sometimes form with a disordered structure that readily oxidizes to molten boria at high temperatures, exposing fibers to oxidation and causing fiber degradation. A protective layer of silicon carbide can be included in the coating system, but the roughness of such layers can lead to cracking which creates pathways for oxidant ingress to inner boron nitride layers, exposing the fiber to molten borosilicate. Therefore, coating materials with a greater oxidation resistance are desirable.

SUMMARY

A coated fiber structure for use in a ceramic matrix composite comprises a fiber extending along a fiber axis and an interface coating arrangement applied to and circumscribing the fiber. The interface coating arrangement comprises: a first boron nitride layer extending coaxially about and in direct contact with the fiber, a first silicon-doped boron nitride layer extending coaxially about and in direct contact with the first boron nitride layer, a carbon layer extending coaxially about and in direct contact with the first silicon-doped boron nitride layer, a second boron nitride layer extending coaxially about and in direct contact with the carbon layer, and a second silicon-doped boron nitride layer extending coaxially about and in direct contact with the second boron nitride layer. A silicon content of the first silicon-doped boron nitride layer is higher than the silicon content of the second silicon-doped boron nitride layer.

A method of forming a ceramic matrix composite comprises forming a fibrous preform by arranging a plurality of ceramic fibers, depositing a first boron nitride layer on the plurality of ceramic fibers, depositing a first silicon-doped boron nitride layer on the first boron nitride layer, depositing a carbon layer on the first silicon-doped boron nitride layer, depositing a second boron nitride layer on the carbon layer, and depositing a second silicon-doped boron nitride layer on the second boron nitride layer. A silicon content of the first silicon-doped boron nitride layer is higher than the silicon content of the second silicon-doped boron nitride layer. The method further comprises depositing a silicon carbide matrix on the fibrous preform.

Figure 1:
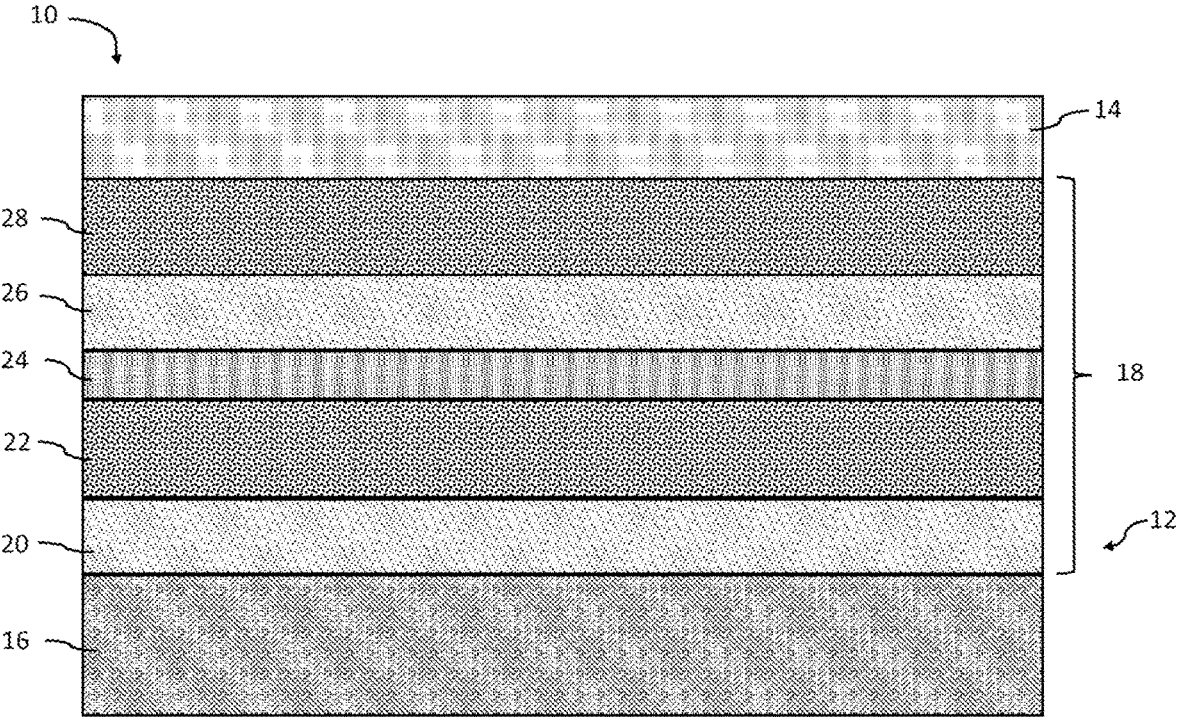
FIG. 1 is a simplified cross-sectional view of a CMC with a multilayer interface coating arrangement.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents various fiber coating arrangements for improving mechanical, thermal, and/or oxidation resistance properties of CMCs.

FIG. 1 is a simplified cross-sectional illustration of CMC 10, formed from coated fibers 12 (only one is represented in FIG. 1) and matrix 14. CMC 10 can be suitable for use in, for example, a gas turbine engine. Coated fiber 12 can include fiber 16 with interface coating arrangement 18. Although not visible in FIG. 1, fiber 16 is generally circumscribed by coating arrangement 18 and matrix 14, and the various layers of coating arrangement 18 are coaxial with one another and fiber 16. Fiber 16 can be formed from silicon carbide (SiC) or other suitable ceramic material. Multiple fibers 16 of the encompassing CMC 10 can be arranged in various woven or non-woven, unidirectional or multidirectional architectures. Matrix 14 can be formed from SiC or other suitable ceramic material.

Beginning closest to fiber 16 and working outward toward matrix 14, interface coating arrangement 18 includes inner boron nitride (BN) layer 20, inner silicon-doped boron nitride (SiBN) layer 22, carbon layer 24, outer BN layer 26, and outer SiBN layer 28. As used herein, the terms "inner" and "outer" are relative to one another and fiber 16, such that an outer layer (e.g., outer BN layer 26) is positioned further from fiber 16 than an inner layer (e.g., inner BN layer 20). Inner SiBN layer 22 can have a silicon content ranging from 15% by weight (wt %) to 30 wt %, and in an exemplary embodiment, 20 wt %. Outer SiBN layer 28 can have a silicon content ranging from 5 wt % to 15 wt %, and in an exemplary embodiment, 10 wt %. Each of inner BN layer 20 and outer BN layer 26 can have a thickness ranging from 50 nm to 200 nm. Each of inner SiBN layer 22 and outer SiBN layer 28 can have a thickness ranging from 200 nm to 500 nm. Carbon layer 24 can have a thickness ranging from 20 nm to 30 nm. In general, the individual layers of coating arrangement 18 can have a generally uniform thickness, although variances can occur. Further, coating arrangement 18 can still be effective even if discontinuities exist within its individual layers.

In an operational environment (e.g., a gas turbine engine), cracks can form in matrix 14 and propagate towards fiber 16. For example, cracks can penetrate matrix 14, outer SiBN layer 28, and outer BN layer 26. Crack deflection can occur at outer BN layer 26 and/or carbon layer 24, and in some cases, at the interface of carbon layer 24 and outer BN layer 26. This can occur because carbon layer 24 can include aligned carbon, with planes oriented generally parallel to fiber 16. Accordingly, cracks tend to deflect away from fiber 16 in the direction of these planes. Carbon layer 24 can further become debonded from inner SiBN layer 22, leaving inner SiBN layer 22 partially exposed. Temperatures ranging from 700° C. to 1000° C. can create oxidizing conditions, and outer BN layer 26 can begin to recede as boron within the layer oxidizes and volatilizes. Exposed to the oxidizing conditions, silicon within inner SiBN layer 22 can oxidize to form a glassy network of silica ($SiO_2$), thus protecting inner BN layer 20 and fiber 16. Silicon within outer SiBN layer 28 can similarly oxidize to form a layer of protective silica bridging/at least partially closing off any cracks extending through outer SiBN layer 28, preventing further ingress of cracks and/or oxidants. Because of the relatively higher silicon content within inner SiBN layer 22, the silicon tends to oxidize more slowly than the silicon within outer SiBN layer 28, with its relatively lower silicon content. The relative rates of oxidation within inner SiBN layer 22 and outer SiBN layer 28 beneficially minimize oxidation and degradation of fiber 16. For example, as noted above the relatively faster oxidation of outer SiBN layer 28 prevents further ingress of cracks and/or oxidants after the bridging silica forms, which protects inward layers (i.e., 20-26) and fiber 16. SiBN layer 22 remains intact for a longer period, with its relatively slower oxidation rate, increasing the duration of time before inner SiBN layer 22 is fully oxidized and volatilized in the operating environment.

Figure 2:
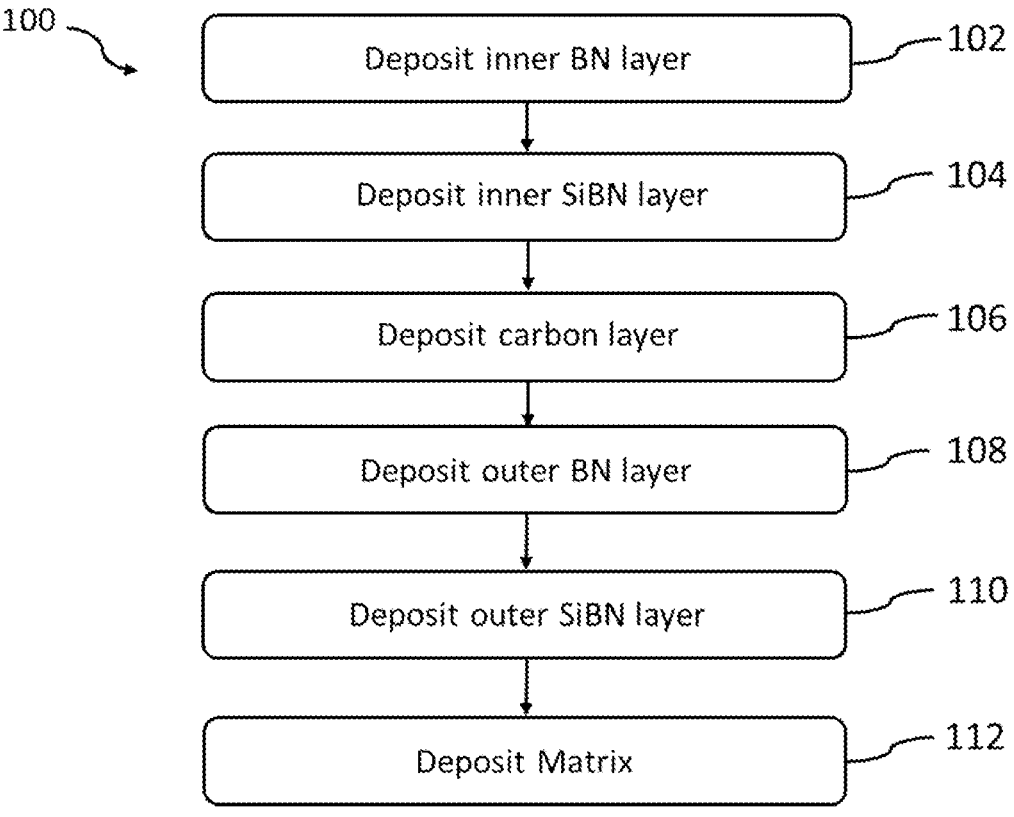
FIG. 2 is a flowchart illustrating a method of forming the CMC of FIG. 1.

FIG. 2 is a method flowchart illustrating steps 102-112 of method 100 for forming a CMC, such as CMC 10, with interface coating arrangement 18. At step 102, a preform of multiple fibers 16 can be placed in tooling and/or a reaction furnace, and inner BN layer 20 with a thickness of 50 nm to 200 nm deposited on fibers 12 using chemical vapor infiltration (CVI). At step 104, inner SiBN layer 22 with a thickness of 200 nm to 500 nm can be deposited over inner BN layer 20 using CVI. At step 106, carbon layer 24 with a thickness of 20 nm to 30 nm can be deposited over inner SiBN layer 22 using CVI. At step 108, outer BN layer 26 with a thickness of 50 nm to 200 nm can be deposited over carbon layer 24 using CVI. At step 110, outer SiBN layer 28 with a thickness of 200 nm to 500 nm can be deposited over outer BN layer 26 using CVI. Each layer 20-28 can be generally amorphous and smooth, with a root mean square (RMS) roughness is less than 20 nm.

At step 112, matrix 14 can be deposited over coating arrangement 18 of the preform. Matrix 14 can be deposited using CVI, which can be carried out until the resulting CMC (e.g., CMC 10) has reached the desired residual porosity. Other techniques for matrix formation are contemplated herein, such as one or a combination of slurry infiltration, melt infiltration, and polymer infiltration and pyrolysis. Such techniques can supplement the CVI process. Protective coatings for the CMC (e.g., thermal barrier coatings, environmental barrier coatings, etc.) can optionally be applied after step 112.

A CMC component formed with the disclosed fiber coating arrangements can be incorporated into aerospace, maritime, or industrial equipment, to name a few, non-limiting examples.

Discussion of Possible Embodiments

The following are non-exclusive descriptions of possible embodiments of the present invention.

A coated fiber structure for use in a ceramic matrix composite comprises a fiber extending along a fiber axis and an interface coating arrangement applied to and circumscribing the fiber. The interface coating arrangement comprises: a first boron nitride layer extending coaxially about and in direct contact with the fiber, a first silicon-doped boron nitride layer extending coaxially about and in direct contact with the first boron nitride layer, a carbon layer extending coaxially about and in direct contact with the first silicon-doped boron nitride layer, a second boron nitride layer extending coaxially about and in direct contact with the carbon layer, and a second silicon-doped boron nitride layer extending coaxially about and in direct contact with the second boron nitride layer. A silicon content of the first silicon-doped boron nitride layer is higher than the silicon content of the second silicon-doped boron nitride layer.

The fiber structure of the preceding paragraph can optionally include, additionally and/or alternatively, any one or more of the following features, configurations and/or additional components:

In the above fiber structure, the silicon content of the first silicon-doped boron nitride layer can range from 15 wt % to 30 wt %, and the silicon content of the second silicon-doped boron nitride layer can range from 5 wt % to 15 wt %.

In any of the above fiber structures, the silicon content of the first silicon-doped boron nitride layer can be 20 wt %.

In any of the above fiber structures, the silicon content of the second silicon-doped boron nitride layer can be 10 wt %.

In any of the above fiber structures, a layer thickness of the first boron nitride layer can range from 50 nm to 200 nm.

In any of the above fiber structures, a layer thickness of the first silicon-doped boron nitride layer can range from 200 nm to 500 nm.

In any of the above fiber structures, a layer thickness of the carbon layer can range from 20 nm to 30 nm.

In any of the above fiber structures, a layer thickness of the second boron nitride layer can range from 50 nm to 200 nm.

In any of the above fiber structures, a layer thickness of the second silicon-doped boron nitride layer can range from 200 nm to 500 nm.

In any of the above fiber structures, each of the first boron nitride layer, the first silicon-doped boron nitride layer, the carbon layer, the second boron nitride layer, and the second silicon-doped boron nitride layer can have a root mean square roughness less than 20 nm.

In any of the above fiber structures, the fiber can be formed from silicon carbide.

A ceramic matrix composite can include a plurality of any of the above fiber structures, and a silicon carbide matrix formed upon the interface coating arrangement of the plurality of fiber structures.

A method of forming a ceramic matrix composite comprises forming a fibrous preform by arranging a plurality of ceramic fibers, depositing a first boron nitride layer on the plurality of ceramic fibers, depositing a first silicon-doped boron nitride layer on the first boron nitride layer, depositing a carbon layer on the first silicon-doped boron nitride layer, depositing a second boron nitride layer on the carbon layer, and depositing a second silicon-doped boron nitride layer on the second boron nitride layer. A silicon content of the first silicon-doped boron nitride layer is higher than the silicon content of the second silicon-doped boron nitride layer. The method further comprises depositing a silicon carbide matrix on the fibrous preform.

The method of the preceding paragraph can optionally include, additionally and/or alternatively, any one or more of the following features, configurations and/or additional components:

In the above method, each of the first boron nitride layer, the first silicon-doped boron nitride layer, the carbon layer, the second boron nitride layer, and the second silicon-doped boron nitride layer can be deposited using chemical vapor infiltration.

In any of the above methods, the silicon content of the first silicon-doped boron nitride layer can range from 15 wt % to 30 wt %, and the silicon content of the second silicon-doped boron nitride layer can range from 5 wt % to 15 wt %.

In any of the above methods, the silicon content of the first silicon-doped boron nitride layer can be 20 wt %, and the silicon content of the second silicon-doped boron nitride layer can be 10 wt %.

In any of the above methods, a layer thickness of each of the first boron nitride layer and the second boron nitride layer can range from 50 nm to 200 nm.

In any of the above methods, a layer thickness of each of the first silicon-doped boron nitride layer and the second silicon-doped boron nitride layer can range from 200 nm to 500 nm.

In any of the above methods, a layer thickness of the carbon layer can range from 20 nm to 30 nm.

In any of the above methods, the silicon carbide matrix can be deposited using chemical vapor infiltration.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A coated fiber structure for use in a ceramic matrix composite, the coated fiber structure comprising:
a fiber extending along a fiber axis; and
an interface coating arrangement applied to and circumscribing the fiber, the interface coating arrangement comprising:
a first boron nitride layer extending coaxially about and in direct contact with the fiber;
a first silicon-doped boron nitride layer extending coaxially about and in direct contact with the first boron nitride layer;
a carbon layer extending coaxially about and in direct contact with the first silicon-doped boron nitride layer;
a second boron nitride layer extending coaxially about and in direct contact with the carbon layer; and
a second silicon-doped boron nitride layer extending coaxially about and in direct contact with the second boron nitride layer;
wherein a silicon content of the first silicon-doped boron nitride layer is higher than the silicon content of the second silicon-doped boron nitride layer and wherein the silicon content of the first silicon-doped boron nitride layer ranges from 15 wt % to 30 wt %, and wherein the silicon content of the second silicon-doped boron nitride layer ranges from 5 wt % to 15 wt %.

2. The fiber structure of claim 1, wherein the silicon content of the first silicon-doped boron nitride layer is 20 wt %.

3. The fiber structure of claim 2, wherein the silicon content of the second silicon-doped boron nitride layer is 10 wt %.

4. The fiber structure of claim 1, wherein a layer thickness of the first boron nitride layer ranges from 50 nm to 200 nm.

5. The fiber structure of claim 1, wherein a layer thickness of the first silicon-doped boron nitride layer ranges from 200 nm to 500 nm.

6. The fiber structure of claim 1, wherein a layer thickness of the carbon layer ranges from 20 nm to 30 nm.

7. The fiber structure of claim 1, wherein a layer thickness of the second boron nitride layer ranges from 50 nm to 200 nm.

8. The fiber structure of claim 1, wherein a layer thickness of the second silicon-doped boron nitride layer ranges from 200 nm to 500 nm.

9. The fiber structure of claim 1, wherein each of the first boron nitride layer, the first silicon-doped boron nitride layer, the carbon layer, the second boron nitride layer, and the second silicon-doped boron nitride layer have a root mean square roughness less than 20 nm.

10. The fiber structure of claim 1, wherein the fiber is formed from silicon carbide.

11. A ceramic matrix composite comprising:
a plurality of coated fiber structures of claim 1; and
a silicon carbide matrix formed upon the interface coating arrangement of the plurality of coated fiber structures.

12. A method of forming a ceramic matrix composite, the method comprising:
forming a fibrous preform by:
arranging a plurality of ceramic fibers;
depositing a first boron nitride layer on the plurality of ceramic fibers;
depositing a first silicon-doped boron nitride layer on the first boron nitride layer, wherein the silicon content of the first silicon-doped boron nitride layer ranges from 15 wt % to 30 wt %;
depositing a carbon layer on the first silicon-doped boron nitride layer;
depositing a second boron nitride layer on the carbon layer; and
depositing a second silicon-doped boron nitride layer on the second boron nitride layer, wherein the silicon content of the second silicon-doped boron nitride layer ranges from 5 wt % to 15 wt %;
wherein a silicon content of the first silicon-doped boron nitride layer is higher than the silicon content of the second silicon-doped boron nitride layer; and
depositing a silicon carbide matrix on the fibrous preform.

13. The method of claim 12, wherein each of the first boron nitride layer, the first silicon-doped boron nitride layer, the carbon layer, the second boron nitride layer, and the second silicon-doped boron nitride layer are deposited using chemical vapor infiltration.

14. The method of claim 12, wherein the silicon content of the first silicon-doped boron nitride layer is 20 wt %, and wherein the silicon content of the second silicon-doped boron nitride layer is 10 wt %.

15. The method of claim 12, wherein a layer thickness of each of the first boron nitride layer and the second boron nitride layer ranges from 50 nm to 200 nm.

16. The method of claim 12, wherein a layer thickness of each of the first silicon-doped boron nitride layer and the second silicon-doped boron nitride layer ranges from 200 nm to 500 nm.

17. The method of claim 12, wherein a layer thickness of the carbon layer ranges from 20 nm to 30 nm.

18. The method of claim 12, wherein the silicon carbide matrix is deposited using chemical vapor infiltration.

* * * * *